March 25, 1930.  P. LIEBERGELD  1,752,188
MECHANICAL TIME FUSE
Filed Oct. 25, 1928  2 Sheets-Sheet 1
Fig. 1
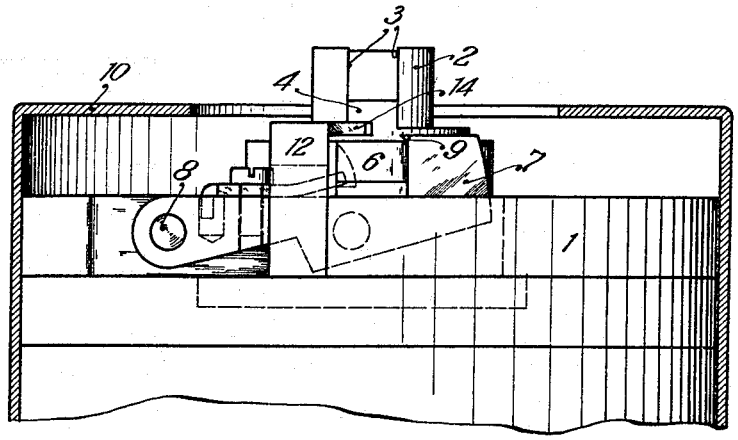
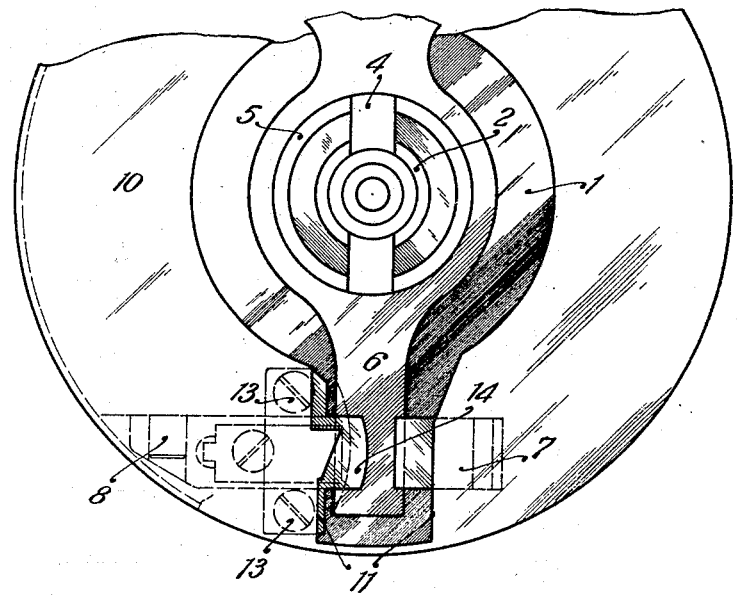
Fig. 2
P. Liebergeld
INVENTOR March 25, 1930.  P. LIEBERGELD  1,752,188
MECHANICAL TIME FUSE
Filed Oct. 25, 1928  2 Sheets-Sheet 2

Patented Mar. 25, 1930

1,752,188

UNITED STATES PATENT OFFICE

PAUL LIEBERGELD, OF BAD THAL, GERMANY

MECHANICAL TIME FUSE

Application filed October 25, 1928, Serial No. 315,078, and in Sweden September 15, 1928.

This invention relates to mechanical time fuses with clockwork mechanism and has for its object to prevent so-called premature explosions with time fuses of this kind.

The invention relates more particularly to time fuses of the kind in which the clockwork shaft carries a pointer which, at the moment of firing, is liberated by a securing device which has secured it up to that moment in the inoperative position and thereupon coacts with an adjustable time determining ring, finally passing through a gap in the said time determining ring and at the same time liberating the ignition device previously secured by it.

In time fuses of this kind it may occur, that the time determining ring is inadvertently wrongly adjusted and that, when the gun is fired, the gap in the ring will occupy its zero position with respect to the pointer of the clockwork mechanism, so that at the moment of firing the pointer can immediately pass through the said gap, thus initiating the ignition. The projectile will in that case explode shortly after it has left the barrel and will inevitably cause considerable damage. The present invention has for its object to overcome this difficulty in a reliable manner.

The invention consists more particularly in this, that besides the securing device for the pointer, which is released at the moment of firing, a second securing device is provided between the pointer and the time determining ring, which at first remains effective even after the gun has been fired and prevents only the coaction of the pointer with the time determining ring, but not the rotation of the pointer, for a period of time, which suffices for preventing a premature explosion within a predetermined distance.

Figure 3:
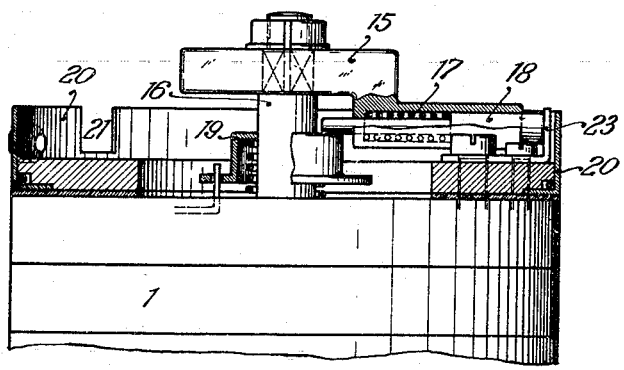
Figure 4:
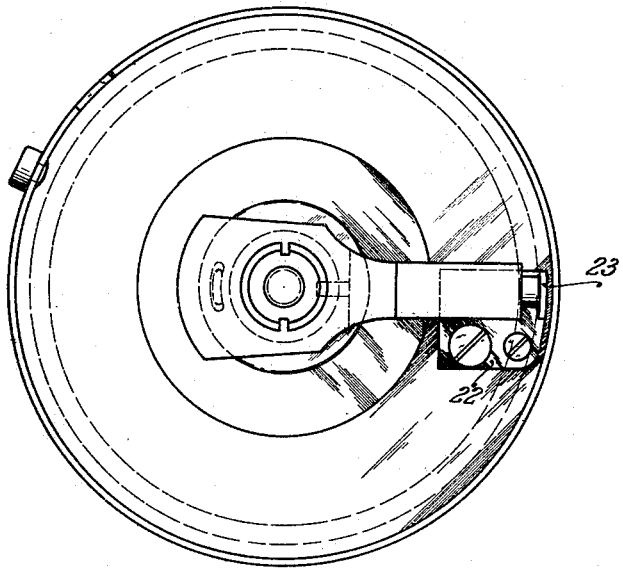

The accompanying drawings illustrate two constructional examples of the invention, Fig. 1 being a side elevation of the upper portion of one constructional form of the clockwork to be enclosed in the fuse, Fig. 2 the corresponding plan view, Fig. 3 a side elevation in part section of the upper portion of the second constructional form of the clockwork and Fig. 4 the corresponding plan view.

In the constructional form shown in Figs. 1 and 2 of the drawing 1 is the clockwork support and 2 the shaft of the clockwork, which puts the clockwork mechanism housed within the support in rotation. The upper part of the shaft 2 of the clockwork mechanism is provided with a guiding slot 3 in which the bridge-like transverse member 4 of a ring 5 is capable of sliding vertically. On the ring a pointer 6 is fixed which a compression spring not shown in the drawing continuously seeks to force upward in a known manner, the bridge-like transverse member 4 being of course forced to slide upward in the slot 3, without however the carrying round of the pointer by the rotating clockwork shaft 2 being interfered with. By a hook-shaped securing member 7 which is pivoted about the pin 8 in the clockwork support 1 so as to rotate in a vertical plane and engages with a bevelled projecting rib 9 over the upper edge of the pointer 6 in the opposite direction to the direction of rotation of the latter the pointer is prevented up to the moment of firing from yielding to the upwardly directed pressure of the spring referred to, that is to say it is retained in the inoperative position shown in Fig. 1 on the upper side of the casing 1 of the clockwork mechanism. At the moment of firing, however, the hook-shaped securing member 7 drops downwards owing to its inertia, so that its rib 9 can slide off the upper edge of the clockwork pointer 6, which is to the right in Fig. 2, thus releasing the pointer. The latter is thus able to follow the pressure of the spring and to move upwards until it rests with its two ends against the horizontal time determining ring 10 positioned above the clockwork support 1. As in the time fuses of a known kind the pointer 6 thereupon slides along the said ring under the action of the running down clockwork, until it arrives at a gap 11 provided in the time determining ring 10 and, still under the pressure of the said spring, can pass upwards through the said gap whereupon it releases the ignition device in a known manner and brings about the explosion of the projectile. The duration of the flight of the projectile depends upon the angle through which the pointer has to travel from the moment of its release by the hook-shaped securing member, till it passes through the gap 11, which angle can be varied as desired by the previous adjustment of the time determining ring.

In fuses of this kind it may occur owing to hurry or inadvertence that the time determining ring 10 is incorrectly set and may by chance be at zero or thereabouts, so that at the moment of firing the gap 11 will lie above the clockwork pointer 6. In this case the pointer which, as already stated, is released at the moment of firing by the securing device 7, 9, is free to pass directly through the gap 11 and thus to cause the ignition of the projectile, in other words, the projectile will in this case explode just after leaving the barrel and thereby inevitably cause serious damage. The object of the invention is to provide absolute security against such an occurrence, and this is effected in the following manner:

On the side lying opposite the securing member 7, a second securing member 12 for the pointer 6 is provided, which however is fixed and which consists of a block fixed by means of two screws 13 rigidly on the upper surface of the clockwork support 1 and having a horizontal lug 14 engaging over the pointer when in the zero position. By this lug the clockwork pointer 6 is for the time being held back in the position shown in Fig. 1, even after it has been released at the moment of firing by the hook-shaped securing member 7. Consequently the pointer will be prevented for a time after the moment of firing from yielding to the pressure of the spring and from sliding upwards on the shaft of the clockwork for coacting with the time determining ring 10. The rotary motion of the clockwork shaft 2 which commences immediately after the release of the securing member 7 and consequently the rotary motion of the pointer 6 is however in no way interfered with by the lug 14 of the second securing member 12. The length of the lug 14 is made such that the pointer 6 can only slide off it and thereupon coact with the time determining ring 10, when a predetermined period of time has elapsed and the projectile has thus travelled a certain distance. Even should the gap 11 in the time determining ring 10 lie immediately above the pointer 6 through an incorrect setting of the fuse, the pointer 6 can only pass through the gap 11 and ignition can only take place after this path has been travelled through, in other words, at a distance in which any damage due to premature explosion is no longer to be feared. The arrangement according to the invention thus precludes with absolute certainty so-called premature explosions, at least within a definite radius of safety.

In the constructional form shown in Figs. 3 and 4 the pointer 15 is not slidable on the shaft 16 of the clockwork but is fixed rigidly thereon, so that it can only turn together with it. The forward part of the pointer 15 is provided with a bar in which a pin 18 loaded by a compression spring 17 is slidable, which pin, when in the inoperative position (Fig. 3), engages with its rear end over a spring-loaded cap 19 which secures the ignition device thereby preventing the ignition taking place for the time being. In this constructional form of the invention as well the pointer 15 is secured in its inoperative position in exactly the same way as in the constructional form shown in Figs. 1 and 2 or by any other suitable known securing means. In this example the time determining ring 20 is so arranged that its flange is upwardly directed and the gap 21 in the ring does not allow the passage of the pointer 15 itself but of the spring-loaded pin 18 of the pointer. As soon as the pin has entered the gap 21 under the action of the spring 17 the pin 18 releases the cap 19 and consequently the ignition device, thus initiating the ignition. In order, however, that this can take place only after the projectile has travelled a certain distance, an angle piece 22 is fixed to the casing 1, against the upwardly directed part 23 of which the pin 18 rests under the action of the spring 17, so that the pin cannot for the time being coact with the time determining ring 20 and pass through the gap 21 in the same, without however the rotary motion of the pointer 15 being prevented by the angle 22, 23. The length of the part 23 is made such that the spring-loaded pin 18 can slide off the said part 23 in any case only after the projectile has travelled for a certain time and can rest against the time determining ring 20, sliding along the latter till, after the desired period of time, it passes through the gap 21 and initiates the ignition. In this constructional form of the invention as well a premature explosion is prevented with absolute certainty within the radius of safety, even when, owing to faulty setting of the time determining ring, the gap 21 in the latter should at the moment of firing be exactly opposite the pin 18 in the pointer.

What I claim is:

1. A mechanical time fuse for projectiles, comprising in combination a clockwork mechanism, a rotary shaft in the said mechanism, a pointer mounted on the shaft, a first securing device for securing the pointer in the inoperative position and capable of releasing the pointer at the moment of firing, a time determining ring capable of coacting with the said pointer, a gap in the time determining ring, means for causing the pointer to engage through the said gap on the pointer coming opposite the gap, an igniting device capable of being secured in the inoperative position and of being released by the said pointer, a second securing device for the pointer positioned between the pointer and the time determining ring and capable of remaining effective after the moment of firing for preventing the coaction of the pointer and the time determining ring, but not the rotary motion of the pointer, for a period of time which is sufficient for preventing a premature explosion of the projectile within a predetermined radius of safety, as set forth.

2. A mechanical time fuse for projectiles, comprising in combination a clockwork mechanism, a support for the said clockwork mechanism, a rotary shaft in the said mechanism, a pointer mounted on the shaft so as to be capable of sliding axially thereon, a first securing device for securing the pointer in the inoperative position and capable of releasing the pointer at the moment of firing, a time determining ring extending above the pointer and capable of coacting with the said pointer, a gap in the time determining ring, means for causing the pointer to engage through the said gap on the pointer coming opposite the gap, an igniting device capable of being secured in the inoperative position and of being released by the said pointer, a second securing device for the pointer, comprising a cranked member fixed to the said support, one part of which cranked member projects over the pointer in the direction of rotation of the latter when in the zero position and is of such a length that the pointer can only become disengaged from it, when the projectile has passed beyond a predetermined radius of safety and thus become free to coact with the time determining ring, as set forth.

In testimony whereof I have signed my name to this specification.

PAUL LIEBERGELD.